US012734896B2

(12) United States Patent
Bensch et al.

(10) Patent No.: US 12,734,896 B2
(45) Date of Patent: Sep. 15, 2026

(54) METHOD FOR ACTUATING A FRICTION BRAKE DEVICE, CONTROL UNIT AND ELECTRICALLY DRIVABLE VEHICLE, IN PARTICULAR UTILITY VEHICLE

(71) Applicant: ZF CV Systems Global GmbH, Bern (CH)

(72) Inventors: Uwe Bensch, Hannover (DE); Johannes Heseding, Hannover (DE); Felix Müller-Deile, Hannover (DE); Torsten Wallbaum, Duingen (DE); Malte Weber, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 77 days.

(21) Appl. No.: 18/732,185

(22) Filed: Jun. 3, 2024

(65) Prior Publication Data

US 2024/0317063 A1 Sep. 26, 2024

Related U.S. Application Data

(63) Continuation of application No. PCT/EP2022/083405, filed on Nov. 28, 2022.

(30) Foreign Application Priority Data

Dec. 2, 2021 (DE) ..................... 10 2021 131 753.3

(51) Int. Cl.
*B60L 7/26* (2006.01)

(52) U.S. Cl.
CPC ..................................... *B60L 7/26* (2013.01)

(58) Field of Classification Search
CPC ........ B60L 7/26; B60L 58/12; B60L 2200/36; B60L 2240/36; B60L 2240/485; B60L 2240/545

(Continued)

(56) References Cited

U.S. PATENT DOCUMENTS 5,184,875 A 2/1993 Wrede
6,695,416 B1 2/2004 Reiner
(Continued)

FOREIGN PATENT DOCUMENTS

DE 103 16 090 A1 10/2004
DE 10 2010 000 823 A1 7/2011
(Continued)

OTHER PUBLICATIONS

English translation and Written Opinion of the International Searching Authority dated Mar. 2, 2023 for international application PCT/EP2022/083405 on which this application is based.

(Continued)

*Primary Examiner* — Lindsay M Low
*Assistant Examiner* — Omar Morales
(74) *Attorney, Agent, or Firm* — Walter Ottesen, P.A.

(57) ABSTRACT

A method for operating a friction brake device for an electrically propelled vehicle, in particular a utility vehicle, with an electric drive capable of regenerative braking, the method having the following steps: determining whether braking by the friction brake device is necessary for lining maintenance, causing braking by the friction brake device based on a brake parameter, determining drive information concerning the electric drive, and modifying the brake parameter and a drive parameter depending on the drive information in order to achieve lining maintenance, wherein the drive parameter causes operation of the electric drive depending on the braking.

13 Claims, 3 Drawing Sheets

(58) Field of Classification Search
USPC .......................................................... 701/70
See application file for complete search history.

(56) References Cited

U.S. PATENT DOCUMENTS

| | | | |
|---|---|---|---|
| 2004/0262994 | A1 | 12/2004 | Baumann et al. |
| 2013/0023382 | A1 | 1/2013 | Ljungdahl |

FOREIGN PATENT DOCUMENTS

| | | | | |
|---|---|---|---|---|
| DE | 10 2011 101 773 | A1 | | 11/2012 |
| DE | 10 2016 217 680 | A1 | | 3/2018 |
| DE | 10 2019 210 918 | A1 | | 1/2021 |
| EP | 0 469 280 | A1 | | 2/1992 |
| EP | 0 974 505 | A1 | | 1/2000 |
| GB | 2542201 | A | | 3/2017 |
| JP | 2012240646 | A | * | 12/2012 |

OTHER PUBLICATIONS

International Search Report of the European Patent Office dated Mar. 2, 2023 for international application PCT/EP2022/083405 on which this application is based.

* cited by examiner

METHOD FOR ACTUATING A FRICTION BRAKE DEVICE, CONTROL UNIT AND ELECTRICALLY DRIVABLE VEHICLE, IN PARTICULAR UTILITY VEHICLE

CROSS-REFERENCE TO RELATED APPLICATIONS

This application is a continuation application of international patent application PCT/EP2022/083405, filed Nov. 28, 2022, designating the United States and claiming priority from German application 10 2021 131 753.3, filed Dec. 2, 2021, and the entire content of both applications is incorporated herein by reference.

TECHNICAL FIELD

The disclosure relates to a method for actuating a friction braking device for an electrically propelled vehicle, in particular a utility vehicle, with an electric drive capable of regenerative braking. Such a method involves the following steps: determining whether braking by the friction brake device is required and initiating braking by the friction brake device based on a brake parameter. The disclosure relates in particular to electrically powered (utility) vehicles with conventional, in particular pneumatic brakes and at least the electric drive capable of recuperation via regenerative braking, acting on at least one wheel or axle, for example via a differential.

BACKGROUND

Such methods are known in the prior art. There are also known methods for operating a friction brake device for a vehicle that have a continuous brake without a recuperation function instead of the regenerative brake. Classically, the friction brake device is used in vehicles when the regenerative brake or the continuous brake is not able to build up sufficient braking torque to meet the driver's braking request or a braking command.

DE 10 2011 101 773 A1 discloses a method for regulating the braking force of a vehicle that has a friction brake system and a continuous brake system. Friction brake temperatures are determined and, depending on this, a brake force distribution between the friction brake system and the continuous brake system is adjusted.

U.S. Pat. No. 6,695,416 discloses a method for controlling the brake system of a vehicle with a service brake and a continuous brake, wherein the service and continuous brakes are controlled in a coordinated manner, wherein the continuous brake is activated for each braking operation and is controlled depending on the driver's braking request as well as on the driving condition variables, road conditions and operating conditions of the vehicle. Operating conditions include the operation of the accelerator pedal, the failure of the engine, the vehicle speed, the axle load distribution and the load.

DE 10 2019 210 918 A1 discloses a method for controlling a brake system for vehicles with at least one electromotive drive, which can be operated as a regenerative braking device, and at least one friction braking device, wherein in braking operation a distribution of the required braking power between the friction brake device and the regenerative braking device changes cyclically. The method can be activated depending on when the brake device reaches a temperature above a temperature threshold or only during downhill travel.

US 2004/0262994 discloses a method for monitoring and controlling the brake system of a vehicle in order to avoid braking force fading due to excessive temperatures of the brake system. For monitoring purposes, a brake parameter representing the braking load of a wheel brake is recorded and compared with a predefined threshold value. Depending on the comparison and the driving situation of the vehicle and/or the operating condition of a vehicle component in the vehicle, a measure is carried out during a braking process that modifies the deceleration on a wheel brake. The operating state can be a state of charge of a battery. The vehicle can be equipped with system components that enable energy recovery and thus the conversion of kinetic energy into electrical energy. This conversion allows the vehicle to decelerate in addition to and/or as an alternative to friction braking. During braking, an electric motor can be operated as a generator to reduce fuel consumption.

U.S. Pat. No. 5,184,875 discloses a method for operating a brake system with a service brake and an auxiliary brake, wherein signals characterizing the braking effect are detected and evaluated. In an initial operating mode, the auxiliary brake is preferred, and if the signal level is high, the service brake is activated. The number of times the service brake brakes and the intensity detected and, depending on this, a second operating mode is switched to in which only the service brake is activated. This is intended to maintain the performance of the service brake by preventing glazing of the brake linings or to restore it by "free braking" and at the same time to reduce premature wear of the brake linings.

In the case of electrically powered vehicles (electric cars, BEVs; fuel cell vehicles, FCEVs; hybrid electric vehicles (HEV)), the electric drive configured for regenerative braking is prioritized over the friction braking device for reasons of efficiency. As a result, the conventional, especially pneumatic, friction brake device is less actuated for braking the vehicle. As a result, brake linings of the brake device can glaze, which can lead to a significant reduction in braking performance. This may result in the required braking power not being able to be called up in certain situations.

Glazing can be avoided by inducing a high temperature of the brake linings. High temperatures can be achieved by actuating the friction brake device with a certain force over a certain period of time, wherein a certain amount of heat is produced that is reflected in the temperature. For this purpose, so-called self-cleaning braking is carried out. Self-cleaning braking is carried out for lining maintenance. In the following, self-cleaning braking refers to braking via a friction braking device which is carried out in order to maintain the braking effect by avoiding glazing of at least one friction partner of the friction braking device, in particular a brake lining, or which is carried out in order to rid an already glazed friction partner from glazing to such an extent that the braking performance or a predetermined coefficient of friction is restored.

Basically, it is most suitable to select such braking for lining maintenance as self-cleaning braking that lasts long enough and produces sufficient heat to heat the friction brake device or brake lining sufficiently. Thermal models according to the prior art can be used to determine the necessary braking point in time and braking force.

There is room for improvement in the methods that are intended to prevent glazing of the brake linings via regular and sufficient heating via active self-cleaning braking. Methods according to the prior art use, for example, braking process counters that perform a certain percentage of braking processes not by the electric drive but by the friction brake device. This is detrimental to efficiency, but may be necessary for brake lining retention. However, it cannot be ruled out that several attempts at self-cleaning braking will have to be carried out, as a self-cleaning braking process will be interrupted prematurely, that is, before a predetermined temperature is reached. For example, a self-cleaning braking process is interrupted in accordance with a driver's request where the driver does not brake or, in the case of a (partially) autonomous vehicle, in accordance with a command to release the brake. This means that the heat generated by the braking of the friction brake device is not sufficient to prevent glazing and thus to carry out successful lining maintenance. Thus, it is potentially necessary to carry out several attempts at self-cleaning braking in order to heat up the friction brake device sufficiently and to achieve successful self-cleaning braking. During repeated unsuccessful attempts at self-cleaning braking, energy potentially usable for locomotion is converted into thermal energy without preventing glazing. This reduces the recuperation potential and the range of the vehicle without achieving the goal of self-cleaning braking, namely lining maintenance.

SUMMARY

It is an object of the disclosure to specify a method that avoids multiple attempts at self-cleaning braking and thus increases the efficiency and range of the vehicle.

The aforementioned object is, for example, achieved by a method for operating a friction brake device for an electrically propelled vehicle having an electric drive capable of regenerative braking. The method includes: determining whether a braking by the friction brake device is required for lining maintenance; and, causing the braking by the friction brake device based on a brake parameter, wherein the causing the braking by the friction brake device based on the brake parameter includes: determining drive information relating to the electric drive; and, modifying the brake parameter and a drive parameter in dependence upon the drive information to achieve the lining maintenance, wherein the drive parameter causes an operation of the electric drive in dependence upon the braking.

The aforementioned object is, for example, further achieved by a control device configured to perform various methods according to the disclosure and by a vehicle, in particular a utility vehicle, having such a control device, a friction brake device, and an electric drive capable of regenerative braking.

With the method according to the disclosure for actuating a friction brake device for an electrically propelled vehicle, in particular a utility vehicle, with an electric drive capable of regenerative braking, it is determined whether braking by the friction brake device is required for lining maintenance, and braking is caused by the friction brake device based on a brake parameter. The brake parameter includes one or more variables that characterize frictional braking, for example to characterize a force, a torque, a duration of braking and/or a time dependence of the force and/or the torque. In the prior art, the brake parameter is defined, for example, by pressing the brake pedal or, in the case of a (partially) autonomous vehicle, by a braking command. The determination of whether braking by the friction brake device is necessary results from whether self-cleaning braking is to be carried out. Friction braking is typically held back and only carried out when lining maintenance or self-cleaning braking is required. If it has been determined that braking by the friction brake device is required, braking by the friction brake device is carried out based on the brake parameter.

According to the disclosure, drive information relating to the electric drive is determined. The drive information is determined so that the method according to the disclosure can combine information about the friction brake device with information about the electric drive for reasons of efficiency in order to successfully complete self-cleaning braking and thus achieve lining maintenance. For example, braking by the friction brake device is not based solely on information about the friction brake device in order to determine the brake parameter.

According to the disclosure, the brake parameter and a drive parameter are modified depending on the drive information in order to achieve lining maintenance, wherein the drive parameter causes the electric drive to operate depending on the braking. With the method according to the disclosure, the braking by the friction brake device is linked to the electric drive. Brake parameters and drive parameters are modified in coordination with each other in order to be able to successfully complete lining maintenance. In order to achieve lining maintenance, the brake parameter and the drive parameter are coordinated in such a way that the temperature of the friction brake device and in particular a brake lining reaches or exceeds a predetermined temperature, optionally a predetermined temperature threshold value. This ensures that the brake linings do not lose their friction coefficients due to self-cleaning braking, despite prioritizing the electric drive for vehicle deceleration, and can provide adequate braking power at all times for hard braking. The disclosure recognized that the combination of the electric drive and the friction brake device were decisive for this. This minimizes a negative impact on the efficiency of the vehicle because the need to repeatedly carry out a self-cleaning braking attempt is reliably avoided. The components that are decisive for the efficiency of the vehicle, namely the electric drive and the friction braking device, are thus taken into account in the self-cleaning braking. By modifying the brake parameter and the drive parameter, braking by the friction brake device as self-cleaning braking is maintained or carried out in a targeted manner so that glazing of the brake linings is reliably avoided.

The sequence of the specified steps of the method is not limited to the specified order. For example, drive information can be provided by the friction brake device before determining whether braking is required for lining maintenance, or before the friction brake device initiates braking. For example, the modification of the brake parameter and the drive parameter can be done before, during and/or after the braking device is initiated by the friction brake device based on the brake parameter.

Preferably, the modification of brake parameter and the drive parameter is carried out in such a way that the braking by the friction brake device in a drive phase is coordinated with the driving of the vehicle by the electric drive. Optionally, the brake parameter and the drive parameter each include temporal information, for example with regard to a braking and drive point in time and/or a braking and drive interval. This embodiment is temporarily not efficiency-neutral, as driving of the vehicle and braking of the vehicle are carried out at the same time. However, adapting the braking to a drive phase ensures that sufficient self-cleaning braking is carried out reliably. This means that further possibly unsuccessful attempts at self-cleaning braking are unnecessary. This means that no energy has to be spent on further self-cleaning braking attempts, which leads to an overall increase in efficiency.

It is advantageous to modify the brake parameter and the drive parameter during braking via the friction brake device. This ensures that the brake parameter and the drive parameter can also be modified during braking in such a way that successful lining maintenance is carried out. If, for example, friction braking has been initiated for the purpose of lining maintenance, and it turns out during braking by the friction brake device, for example via a thermal model and/or a temperature measurement, that the energy over the time of braking was or will not be sufficient to reach the temperature required for self-cleaning braking, the brake parameter is modified in coordination with the drive parameter in such a way that a frictional braking torque is maintained and compensated by the electric drive.

The method also preferably has the step: Determining a braking point in time. The braking point in time is a point in time by which successful self-cleaning braking should be carried out. It is advantageous to determine the braking point in time by determining the operating information of the vehicle. The operating information includes information relating to the operation of the vehicle, such as information on the time since the last successful self-cleaning braking, on the operating duration or operating time of the vehicle, material characteristics, the load of the vehicle and/or on an operating mode, for example whether the vehicle is driven manually or (partially) autonomously. In particular, the time since the last successful self-cleaning braking can provide information about whether and, if appropriate, when a new self-cleaning braking should be carried out. Based on the operating information, a suitable situation is identified within a parameterizable time window in which self-cleaning braking is carried out in the most efficiency-neutral way possible. Alternatively or additionally, determining the braking point in time includes a prediction and/or calculation of future drive information. Future drive information can be predicted and/or computed, for example, via the operating information, based on navigation data and/or based on a repetitive sequence of drive information. This means that load changes, for example, can be included in the determination of the braking point in time. In addition, or alternatively, the determination of the braking point in time includes an evaluation of topological information, location information and/or speed information. Optionally, predictive data is taken into account that has an influence on the actuation of the electric drive, for example long downhill sections.

It is advantageous to determine whether braking is required by the friction brake device, taking into account a determination of the temperature of the friction brake device and/or taking into account a or the braking point in time. The temperature is optionally determined via a thermal model, which determines a temperature or amount of energy from braking force and duration. Alternatively or additionally, the temperature is determined via a temperature measurement arrangement. The temperature can be determined at specific times, for example when braking is initiated, and/or at specific intervals or continuously. In particular, the temperature can be determined during braking in order to determine whether lining maintenance is or will be achieved by reaching a predetermined temperature.

Preferably, the drive information includes state of charge information and recuperation information, wherein the state of charge information contains information about a state of charge of an energy storage device for the electric drive and the recuperation information contains information about the recuperation performance of the electric drive. This allows the brake parameter to be modified particularly efficiently in coordination with the electric drive. For example, braking by the friction brake device may be preferred if the energy storage device is already sufficiently charged and recuperation would result in more than a predetermined charge of the energy storage device.

Alternatively or additionally, the drive information includes drive temperature information, which includes information about a temperature of the electric drive. For example, braking by the friction brake device may be preferred if the electric drive and/or the energy storage device has exceeded a predetermined temperature and there is thus a risk of overheating of the electric drive and/or the energy storage device.

Alternatively or additionally, the drive information includes a drive signal that includes information about the actuation of the electric drive. The drive signal is a signal for operating the electric drive that corresponds to a driver's side actuation, for example, of a pedal or, in the case of a (partially) autonomous vehicle, a command. This means that the drive information can include information corresponding to a driver's request, which is taken into account when modifying the brake parameter and the drive parameter. For example, the brake parameter and the drive parameter can be modified in such a way that the driver's request or command is complied with, so that the lining maintenance is carried out unnoticed by the driver or an occupant of the vehicle.

Modification of the brake parameter and the drive parameter is advantageously carried out taking into account a change in the efficiency of the electric drive. Preferably, a change in efficiency can be determined on the basis of an efficiency curve. Alternatively or additionally, a dependence of the efficiency on a state of charge of an energy storage device and/or a drive temperature, in particular the temperature of the energy storage device, can be taken into account. The change in efficiency is taken into account in such a way that the time and duration of the friction braking are optimized with regard to the efficiency of the electric drive at the current operating point.

Preferably, the brake parameter is modified on the basis of material characteristics. Alternatively or additionally, the brake parameter has a parameter relating to a braking force, a duration of braking and/or an amount of heat that can be generated during braking. This allows the brake parameter to be modified on a reliable basis.

A control device according to the disclosure for an electrically propelled vehicle, in particular a utility vehicle, is set up to perform the method according to the disclosure. The control device is advantageously set up to carry out the method, including the advantageous and optional features, in order to achieve the associated technical effects.

According to the disclosure, an electrically propelled vehicle, in particular a utility vehicle, has a friction braking device, an electric drive capable of regenerative braking and a control device according to the disclosure. The control device is advantageously set up to carry out the method, including the advantageous and optional features, in order to achieve the associated technical effects.

BRIEF DESCRIPTION OF DRAWINGS

The invention will now be described with reference to the drawings wherein.

DETAILED DESCRIPTION

Figures 1, 2:
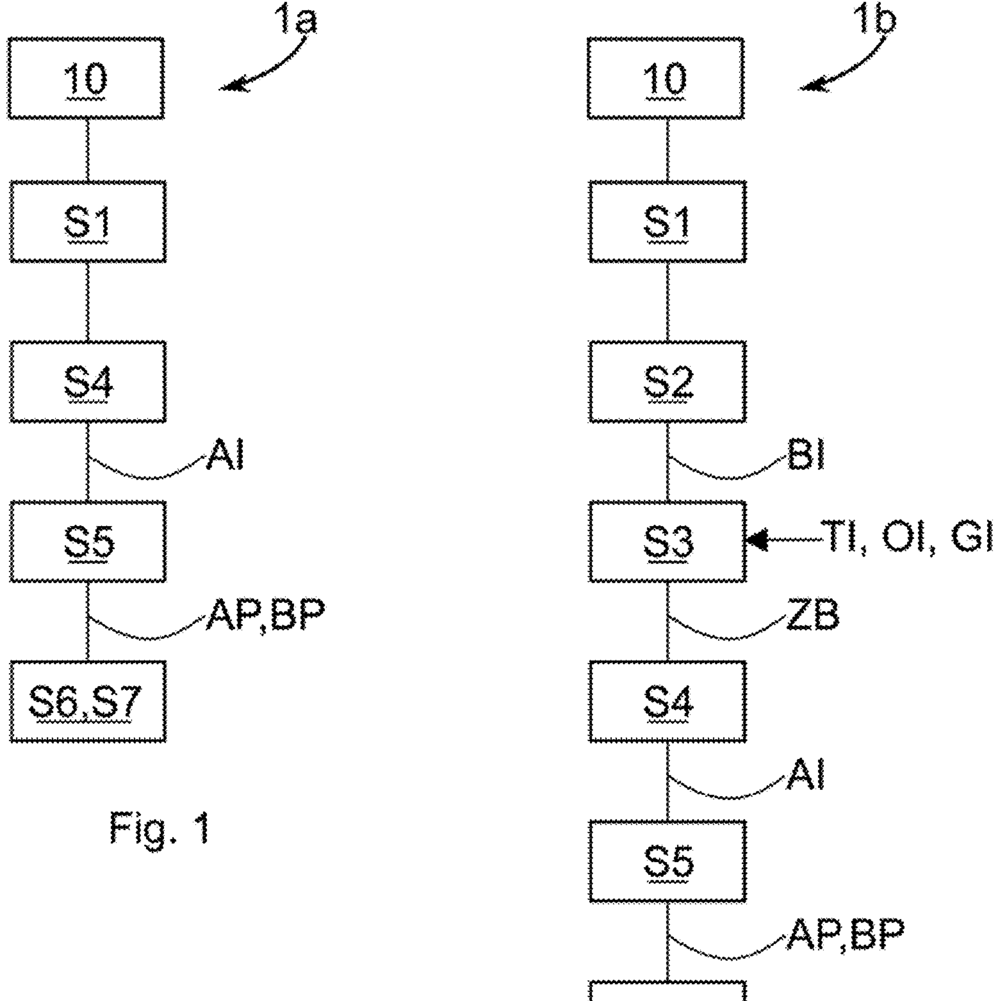
FIG. 1 shows a schematic representation of a method for actuating a friction brake device according to an embodiment of the disclosure.
FIG. 2 shows a schematic representation of a method for actuating a friction brake device according to another embodiment of the disclosure.

FIG. 1 shows a schematic representation of a method 1*a* for actuating a friction brake device 20 according to an embodiment of the disclosure.

The purpose of the method 1*a* is to operate a friction braking device 20 for an electrically propelled vehicle 100*a*, in particular utility vehicle 100*b*, with an electric drive 21 capable of regenerative braking NB. Such a vehicle 100*a* is described with reference to FIG. 4 or such a utility vehicle 100*b* is described with reference to FIG. 5. The method 1*a* according to FIG. 1 is carried out by a control device 10 of the vehicle 100*a*, in particular a utility vehicle 100*b*. The method 1*a* achieves successful self-cleaning braking for the lining maintenance of the brake linings of the friction brake device 20.

The method 1*a* begins with a determination S1 of whether braking S6 by the friction brake device 20 is necessary for lining maintenance. Whether braking S6 is required by the friction brake device 20 for lining maintenance can be determined, for example, from the method described with reference to FIG. 3, taking into account a braking point in time ZB and/or taking into account the temperature TR of the friction brake device 20. For example, self-cleaning braking is required if the temperature TR of the friction brake device 20 has not exceeded a temperature threshold value TS within a time predetermined, for example, by the braking point in time ZB.

If no lining maintenance is required, braking is optionally carried out by the electric drive 21 via regenerative braking NB. Optionally, the appropriate braking is disguised imperceptibly for the driver between active recuperation and service braking.

If braking S6 by the friction brake device 20 is required for lining maintenance, determination S4 of drive information AI relating to the electric drive 21 is carried out in accordance with the embodiment in FIG. 1.

Figure 4:
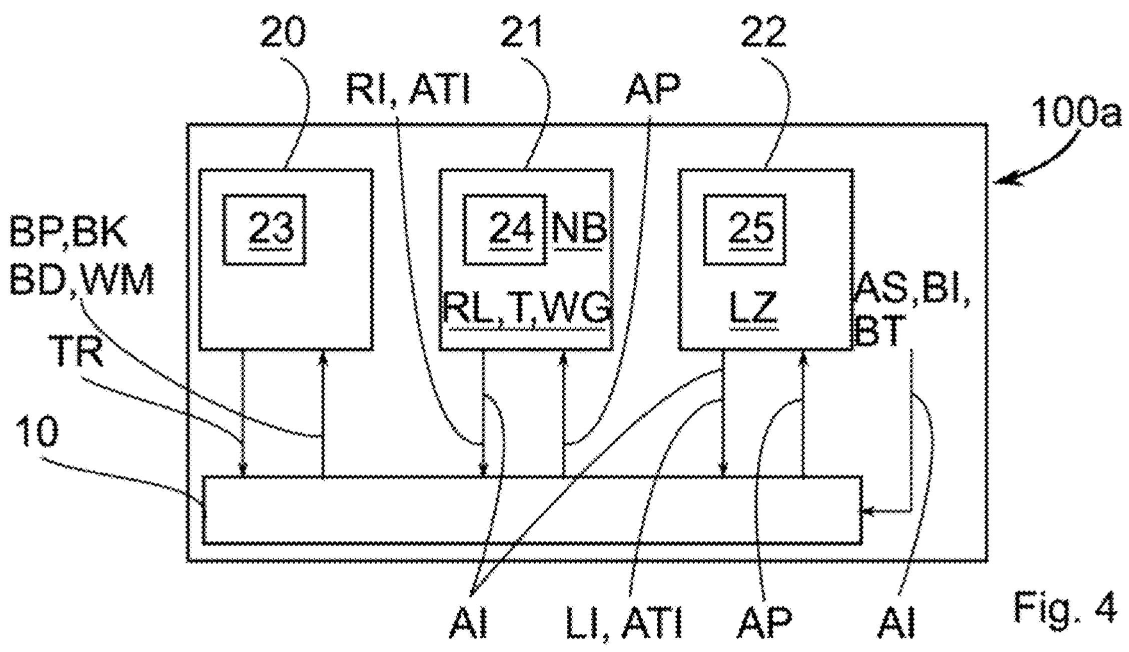
FIG. 4 shows a schematic representation of an electrically propelled vehicle according to an embodiment of the disclosure; and, FIG. 5 shows a schematic representation of an electrically propelled utility vehicle according to an embodiment of the disclosure.
Figure 5:
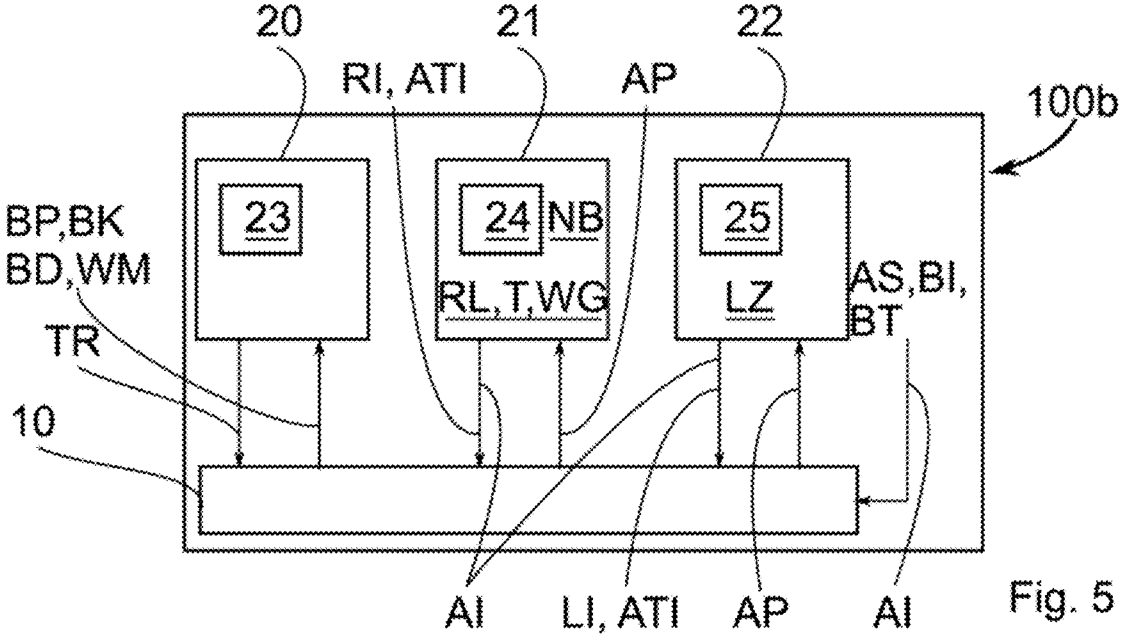

The drive information AI includes state of charge information LI, recuperation information RI, drive temperature information ATI and a drive signal AS as described in FIGS. 4 and 5.

Depending on the drive information AI, a modification S5 of a brake parameter BP follows in order to achieve lining maintenance and a drive parameter AP. The brake parameter BP defines an actuation of the friction brake device 20. The brake parameter BP has a parameter relating to a braking force BK, a duration BD of braking S6 and/or an amount of heat WM that can be generated by braking S6. The drive parameter AP defines an actuation BT of the electric drive 21 to drive the vehicle 100*a*, 100*b*. The drive parameter AP includes information for controlling and/or regulating an energy storage device 22 and/or the electric drive 21 for driving the vehicle 100*a*, 100*b*.

For example, the brake parameter BP and the drive parameter AP are modified taking into account the state of charge information LI of an energy storage device 22 of the vehicle 100*a*, 100*b*, if the state of charge information LI indicates that the energy storage device 22 is largely or fully charged, since both the possible recuperation performance and the energy that can be absorbed above a certain percentage of the charge of the energy storage device 22, for example 90% state of charge, is limited or in order to avoid unnecessary partial charges for reasons of the service life of the energy storage device 22.

For example, the brake parameter BP and the drive parameter AP are modified taking into account the drive temperature information ATI in order to induce braking S6 by the friction brake device 20 at times when the electric drive 21 is in derating, that is, lowering the performance for thermal reasons. In particular, this can be linked to operating information BI, especially regarding longer downhill descents and/or predictive route data, such as length and gradient.

The modification S5 of the brake parameter BP and the drive parameter AP is carried out in such a way that the braking S6 is carried out by the friction brake device 20 in a drive phase S7' matched to the operation S7 of the electric drive 21. In this way, the electric drive 21 can generate a torque for driving the vehicle 100*a*, 100*b*, which is converted into heat by the braking S6 of the friction brake device 20, which is matched to the operation of the electric drive 21. The heat leads to an increase in the temperature TR of the friction brake device 20. The modification S5 of the brake parameter BP and the drive parameter AP is carried out in such a way that the temperature TR of the friction brake device 20 reaches a predetermined temperature threshold value TS. The temperature threshold TS is chosen in such a way as to prevent glazing of a component of the friction brake device 20.

The modification S5 of the brake parameter BP and the drive parameter AP is carried out taking into account a change in the efficiency of the electric drive 21. In particular, a higher drive torque may be required during braking S6 compared to a time before or after braking S6. The drive torque is set during braking S6 via the drive parameter AP. Due to the higher drive torque, the electric drive 21 is operated in a range with a different degree of efficiency. The brake parameter BP and the drive parameter AP are modified in such a way that the efficiency of the electric drive 21 is taken into account. For example, the aim is to prevent the electric drive 21 from being operated with a particularly unfavorable degree of efficiency.

The modification S5 of the brake parameter BP and the drive parameter AP is carried out during braking S6 by the friction brake device 20. This ensures that lining maintenance is carried out particularly reliably. For example, according to a driver's request or a command, the vehicle 100*a* should not decelerate any further before the completion of the self-cleaning braking. In the prior art, self-cleaning braking would stop in this case, which can lead to the fact that the self-cleaning braking cannot be successfully completed. For example, by modifying S5 the brake parameter BP and the drive parameter AP during braking S6, a drive torque can be set by the drive parameter AP that is so large that the braking S6 can be maintained by the friction brake device 20 to successfully complete self-cleaning braking, while at the same time complying with a driver's request or command and the vehicle 100*a* is not decelerated further, but optionally accelerated. If braking S6 has been initiated for lining maintenance, but is stopped before the temperature defined by a thermal model and required for lining maintenance has been reached, the motor operation of the electric drive 21 is carried out for successful completion of the lining maintenance, which then works against the friction brake device 20, and is thus used appropriately to avoid new lining maintenance having to be carried out.

The modification S5 of the brake parameter BP is carried out on the basis of material characteristics. The material characteristics include, in particular, information about a coefficient of friction of the friction brake device 20, about thermal variables of the friction brake device 20, in particular about heat capacity, thermal conductivity and/or a glazing temperature.

In order to carry out the lining maintenance, the braking S6 by the friction brake device 20 is initiated on the basis of the brake parameter BP. The drive parameter AP is modified in such a way that the drive parameter AP triggers operation S7 of the electric drive 21 depending on the braking S6.

FIG. 2 shows a schematic representation of a method 1*b* for actuating a friction brake device 20 according to another embodiment of the disclosure.

Method 1*b* is a preferred embodiment, which is described with reference to method 1*a* in FIG. 1. In particular, the differences between methods 1*a* and 1*b* are described.

The method begins with a determination S1 of whether braking S6 by the friction brake device 20 is required for lining maintenance, as described in FIG. 1.

If braking S6 by the friction brake device 20 is required for lining maintenance, determination S2 of operating information BI of the vehicle 100*a*, 100*b* is carried out in accordance with the method 1*b* according to FIG. 2. The operating information BI includes information relating to the operation of the vehicle, such as information about the operating time of the vehicle 100*a* and the time since the last successful self-cleaning operation.

On the basis of the operating information BI, a determination S3 of a braking point in time ZB is carried out. The braking point in time ZB is a point in time by which successful self-cleaning braking should be performed. The determination S3 of the braking point in time ZB includes a prediction and/or calculation of future drive information AI. The determination S3 of the braking point in time ZB includes an evaluation of topological information TI, location information OI and/or speed information GI. For example, a braking point in time ZB can be determined by taking into account a predicted downhill ride.

The determination S4 of drive information AI concerning the electric drive 21, the modification S5 of the brake parameter BP to achieve lining maintenance and a drive parameter AP depending on the drive information AI, and the initiation of braking S6 by the friction brake device 20 on the basis of the brake parameter BP are carried out as explained with reference to FIG. 1.

Figure 3:
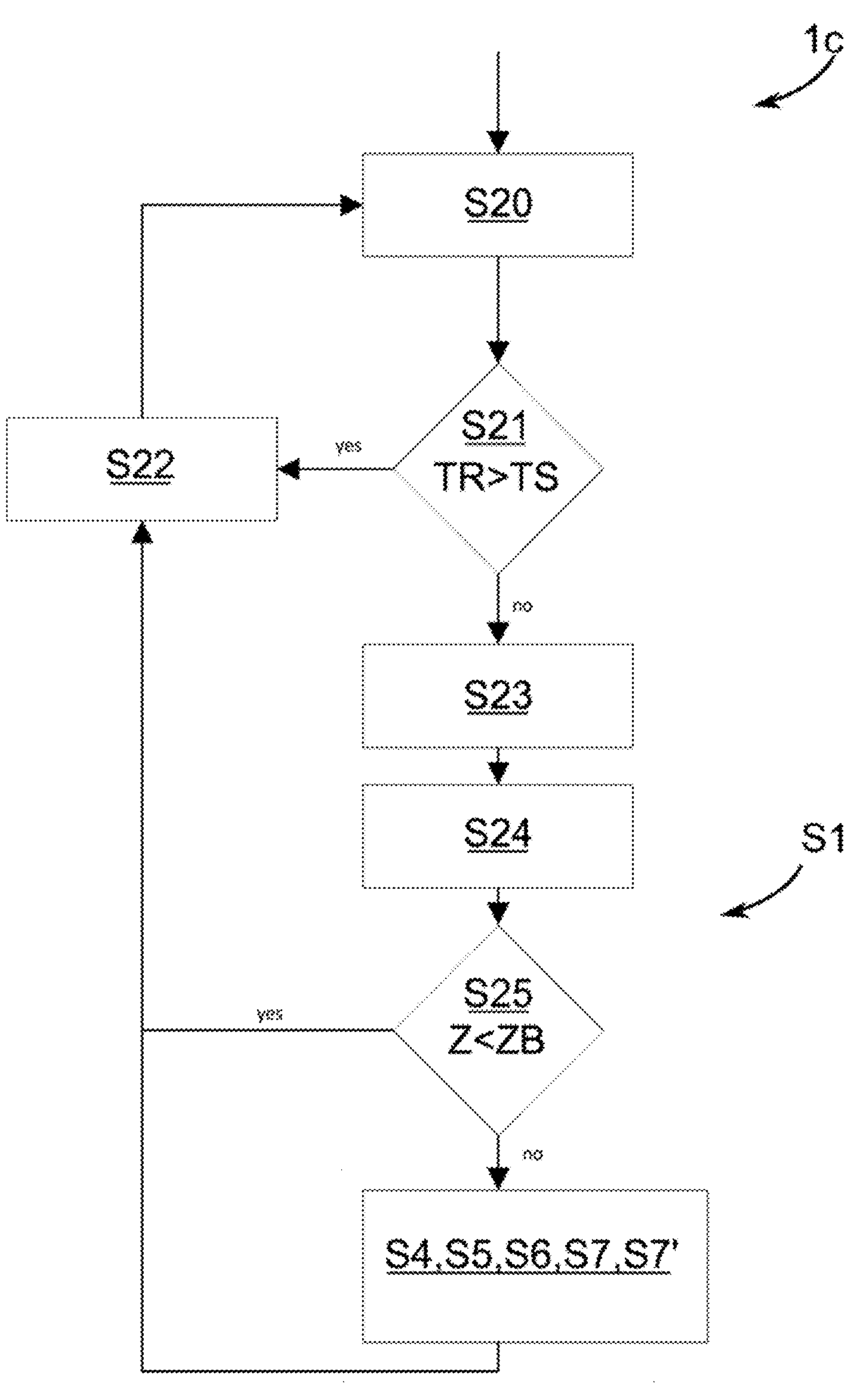
FIG. 3 shows a schematic representation of a method for actuating a friction brake device according to another embodiment of the disclosure.

FIG. 3 shows a schematic representation of a method 1*c* for actuating a friction brake device 20 according to another embodiment of the disclosure.

Method 1*c* represents steps of the method which in particular explains the determination S1 of whether braking S6 by the friction brake device 20 is required.

In a step S20, a time span is determined since the last successful self-cleaning braking or since the last time a temperature threshold value TS was exceeded by the temperature TR of the friction brake device 20. The temperature threshold value TS is chosen in such a way that glazing is avoided at a temperature TR of the friction brake device 20 above the temperature threshold value TS. In step S20, a time window is defined by a braking point in time ZB up to which self-cleaning braking is to be performed. Thus, the braking point in time ZB defines a time window from the current time to the braking point in time ZB at which the successful cleaning braking is to be carried out.

In step S1, a query is made as to whether the temperature TR of the friction brake device 20 exceeds a predetermined temperature threshold value TS. If the temperature TR of the friction brake device 20 exceeds the predetermined temperature threshold TS, the time span in step S22 is reset. A period of time since the last successful self-cleaning braking or since the temperature threshold TS was last exceeded by the temperature TR of the friction brake device 20 is again determined S20.

If the temperature TR of the friction brake device 20 does not exceed the predetermined temperature threshold TS, a determination S23 of a brake parameter BP is carried out. In particular, the force and duration of braking S6 by the friction brake device 20 to be initiated are determined. For this purpose, operating information BI, such as geographical data, can be incorporated.

After the brake parameters BP has been determined in step S23, braking S6 by the friction brake device 20 is initiated S24 on the basis of the brake parameter BP.

During and after the braking S6, a query S25 is submitted as to whether the lining maintenance was successful, that is, whether the braking S6 initiated in step S24 has led to sufficient heating of the friction brake device 20. If the temperature TR of the friction brake device 20 exceeds the predetermined temperature threshold TS during braking S6, the time span in step S22 is reset. Determination of a period of time since the last successful self-cleaning braking S20 is again carried out.

If the temperature TR of the friction brake device 20 does not exceed the predetermined temperature threshold value TS during braking S6, determination S4 of drive information AI relating to the electric drive 21 and modification S5 of the brake parameter BP and a drive parameter AP depending on the drive information AI in order to achieve lining maintenance are carried out, wherein the drive parameter AP causes an operation S7 of the electric drive 21 as a function of the braking S6 as explained with reference to FIGS. 1 and 2. In other words, if there is not sufficiently strong braking S6 by the friction brake device 20 in the desired time window, that is, until the braking point in time ZB, braking S6 coordinated with the electric drive 21 takes place in a drive phase S7'.

If no suitable situation with a sufficient amount of braking energy occurs within a parameterized time window, suitable braking is automatically transferred to the friction brake device 20 instead of being implemented by the electric drive 21 until the required amount of energy/lining temperature is reached.

FIG. 4 shows a schematic representation of an electrically propelled vehicle 100*a* according to an embodiment of the disclosure.

The vehicle 100*a* has a friction brake device 20, a drive 21, an energy storage device 22 and a control device 10.

The vehicle 100*a* is electrically propelled. The electric drive 21 is provided for this purpose. The electric drive 21 can be controlled or regulated by the control device 10. The energy storage device 22 is connected to the electric drive 21 via the control device 10. The energy storage device 22 is set up for storing electrical energy. For driving the vehicle 100*a*, the control device 10 is set up to transmit one or more drive parameters AP to the electric drive 21 and to the energy storage device 22 and/or to apply an electric current to the electric drive 21 based on the drive parameter AP.

The electric drive 21 is set up to perform regenerative braking NB. This means that the electric drive 21 can be used to convert kinetic energy into electrical energy and thus charge the energy storage device 22.

The friction brake device 20 has a friction brake device temperature sensor 23 that is arranged and set up to determine a temperature TR of the friction brake device 20. The friction brake device 20 transmits information concerning the temperature TR of the friction brake device 20 to the control device 10.

The electric drive 21 has a drive temperature sensor 24, which is set up to determine a temperature of the electric drive 21. The temperature of the electric drive 21 is part of drive temperature information ATI. The electric drive 21 transmits drive temperature information ATI concerning the temperature T of the electric drive 21 to the control device 10. The electric drive 21 transmits recuperation information RI relating to the recuperation performance to the control device 10.

The energy storage device 22 has an energy storage device temperature sensor 25 that is set up to detect a temperature of the energy storage device 22. The temperature of the energy storage device 22 is part of the drive temperature information ATI. The energy storage device 22 transmits drive temperature information ATI concerning the temperature of the energy storage device 22 to the control device 10. The energy storage device 22 transmits state of charge information LI concerning the state of charge of the energy storage device 22 to the control device 10.

The control device 10 is set up to detect and/or receive operating information BI relating to the vehicle 100*a*.

The control device 10 is configured to detect, receive and/or detect a drive signal AS with information about actuation BT of the electric drive 21. For example, a drive signal AS can be detected by an interaction between a driver and vehicle 100*a*, for example when the driver presses an accelerator pedal of the vehicle 100*a*. In the case of a (semi-)autonomous vehicle 100*a*, a drive signal AS may be received by an in-vehicle or extra-vehicle device and/or determined taking into account data detected or determined by the vehicle 100*a*, for example on the basis of navigation data.

The recuperation information RI, the drive temperature information ATI, the state of charge information LI and the drive signal AS are drive information AI.

The control device 10 is set up to transmit one or more brake parameters BP to the friction brake device 20 for braking the vehicle 100*a*.

The control device 10 is set up to carry out one or more of the methods described with reference to FIGS. 1 to 3, in particular to carry out a modification S5 of the brake parameter BP and the drive parameter AP while taking into account the drive information AI.

FIG. 5 shows a schematic representation of an electrically propelled utility vehicle 100*b* according to an embodiment of the disclosure.

The embodiment of the disclosure according to FIG. 5 differs from the embodiment of the disclosure according to FIG. 4 in that FIG. 5 concerns a utility vehicle 100*b*.

It is understood that the foregoing description is that of the preferred embodiments of the invention and that various changes and modifications may be made thereto without departing from the spirit and scope of the invention as defined in the appended claims.

REFERENCE SIGN LIST (PART OF THE DESCRIPTION)

1*a*, 1*b*, 1*c* method
10 control device
20 friction brake device
21 drive
22 energy storage device
23 friction brake device temperature sensor
24 drive temperature sensor
25 energy storage device temperature sensor
100*a* vehicle
100*b* utility vehicle
S1 determining whether braking is required
S2 determining operating information
S3 determining a braking point in time
S4 determining drive information
S5 modifying a brake parameter and a drive parameter
S6 braking by the friction brake device
S7 operation of the electric drive
S7' drive phase
S20 determining the time span since last successful self-cleaning braking
S21 querying whether temperature is achieved
S22 resetting the time span
S23 determining a brake parameter
S24 causing braking
S25 querying whether lining maintenance is successful
AI drive information
AP drive parameter
AS drive signal
ATI drive temperature information
BD braking duration
BI operating information
BK braking force
BP brake parameter
BT actuation
GI speed information
LI state of charge information
OI location information
RI recuperation Information
TI topological information
T temperature of an electric drive
TR temperature of a friction brake device
TS temperature threshold value
WG efficiency change
WM amount of heat
ZB braking point in time
Z Time

The invention claimed is:

1. A method for operating a friction brake device for an electrically propelled vehicle having an electric drive capable of regenerative braking, the method comprising:

determining whether a self-cleaning braking by the friction brake device is required for lining maintenance; and, causing the self-cleaning braking by the friction brake device based on a brake parameter, wherein said causing the self-cleaning braking by the friction brake device based on the brake parameter includes:

determining drive information relating to the electric drive; and, modifying the brake parameter and a drive parameter in dependence upon the drive information to achieve the lining maintenance, wherein the drive parameter causes an operation of the electric drive in dependence upon the self-cleaning braking.

2. The method of claim 1, wherein said modifying the brake parameter and the drive parameter is carried out such that the self-cleaning braking is carried out by the friction brake device matched to the operation of the electric drive in a drive phase.

3. The method of claim 1, wherein said modifying the brake parameter and the drive parameter is carried out during the self-cleaning braking by the friction brake device.

4. The method of claim 1, the method further comprising:

determining a braking point in time, wherein at least one of:

said determining the braking point in time is carried out on a basis of a determination of operating information of the vehicle;

said determining the braking point in time includes at least one of a prediction and a calculation of future drive information; and, said determining the braking point in time includes an evaluation of at least one of topological information, location information, and speed information.

5. The method of claim 1, wherein said determining whether braking by the friction brake device is required is carried out while taking into account at least one of a determined temperature of the friction brake device and a braking point in time.

6. The method of claim 1, wherein at least one of:

the drive information includes state of charge information and recuperation information, wherein the state of charge information includes information about a state of charge of an energy storage device for the electric drive and the recuperation information includes information about recuperation performance of the electric drive;

the drive information includes drive temperature information, which includes information about a temperature of the electric drive; and, the drive information includes a drive signal which includes information about an actuation of the electric drive.

7. The method of claim 1, wherein said modifying the brake parameter and the drive parameter is carried out while taking into account a change in efficiency of the electric drive.

8. The method of claim 1, wherein at least one of:

said modifying the brake parameter is carried out on a basis of material characteristics; and, the brake parameter has a parameter relating to at least one of a braking force, a duration of the self-cleaning braking and a quantity of heat that can be generated by the self-cleaning braking.

9. The method of claim 1, wherein the vehicle is a utility vehicle.

10. A control device for an electrically propelled vehicle, the control device comprising:

a non-transitory computer readable medium having program code stored thereon;

a processor;

said program code being configured, when executed by said processor, to:

determine whether self-cleaning braking by a friction brake device is required for lining maintenance; and, cause a self-cleaning braking by the friction brake device based on a brake parameter, wherein the causing the self-cleaning braking by the friction brake device based on the brake parameter includes:

determining drive information relating to an electric drive; and, modifying the brake parameter and a drive parameter in dependence upon the drive information to achieve the lining maintenance, wherein the drive parameter causes an operation of the electric drive in dependence upon the self-cleaning braking.

11. The control device of claim 10, wherein the vehicle is a utility vehicle.

12. An electrically propelled vehicle comprising:

a friction brake device;

an electric drive capable of regenerative braking;

a control device including a processor and a non-transitory computer readable medium having program code stored thereon;

said program code being configured, when executed by said processor, to:

determine whether the self-cleaning braking by said friction brake device is required for lining maintenance; and, cause the self-cleaning braking by said friction brake device based on a brake parameter, wherein the causing the self-cleaning braking by said friction brake device based on the brake parameter includes:

determining drive information relating to said electric drive; and, modifying the brake parameter and a drive parameter in dependence upon the drive information to achieve the lining maintenance, wherein the drive parameter causes an operation of said electric drive in dependence upon the self-cleaning braking.

13. The electrically propelled vehicle of claim 12, wherein the vehicle is a utility vehicle.

* * * * *